United States Patent
Liu et al.

(10) Patent No.: US 10,401,680 B2
(45) Date of Patent: Sep. 3, 2019

(54) BACKLIGHT SOURCE AND DISPLAY DEVICE

(71) Applicants: BOE Technology Group Co., Ltd., Beijing (CN); Beijing BOE Optoelectronics Technology Co., Ltd., Beijing (CN)

(72) Inventors: Yanjun Liu, Beijing (CN); Liguang Deng, Beijing (CN); Ming Zhai, Beijing (CN); Yufei Liu, Beijing (CN); Jinming Yao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/995,885

(22) Filed: Jun. 1, 2018

(65) Prior Publication Data
US 2019/0094621 A1    Mar. 28, 2019

(30) Foreign Application Priority Data

Sep. 22, 2017 (CN) .......................... 2017 1 0866413

(51) Int. Cl.
*F21V 8/00* (2006.01)
*G02F 1/1335* (2006.01)
*G02B 5/00* (2006.01)

(52) U.S. Cl.
CPC ....... *G02F 1/133608* (2013.01); *G02B 5/003* (2013.01); *G02B 6/0016* (2013.01); *G02B 6/0055* (2013.01); *G02F 1/133512* (2013.01)

(58) Field of Classification Search
CPC ......... G02F 1/133608; G02F 1/133512; G02B 5/003; G02B 6/0016; G02B 6/0055
See application file for complete search history.

(56) References Cited

U.S. PATENT DOCUMENTS

2017/0285241 A1*  10/2017  Zhang ....................... F21S 8/00

* cited by examiner

*Primary Examiner* — Thomas M Sember
(74) *Attorney, Agent, or Firm* — Arent Fox LLP; Michael Fainberg

(57) ABSTRACT

This disclosure relates to the field of display technologies, and discloses a backlight source and a display device, and the backlight source includes a back plate, a glue frame installed on the back plate, a light-guiding plate located in an accommodating space surrounded by the glue frame, and an optical film material located on the side of the light-guiding plate away from the back plate, and arranged overlapping with the light-guiding plate, wherein at least one of sides of the light-guiding plate is a light incidence side, and other sides are non-light-incidence sides; and at least one of the non-light-incidence sides, and the glue frame form together a light-eliminating structure configure to eliminate at least a part of light rays exiting from the non-light-incidence side.

16 Claims, 2 Drawing Sheets

BACKLIGHT SOURCE AND DISPLAY DEVICE

CROSS-REFERENCE TO RELATED APPLICATION

This application claims priority of Chinese Patent Application No. 201710866413.1, filed on Sep. 22, 2017, which is hereby incorporated by reference in its entirety.

FIELD

This disclosure relates to the field of display technologies, and particularly to a backlight source and a display device.

BACKGROUND

A backlight source is a light source located behind a liquid crystal display, and generally there are bright lines at the light exit side in a side-lighting structure of backlight source. A reason of the bright lines is that light rays exiting a non-light-incidence side of a light-guiding plate is reflected by a glue frame back into the light-guiding plate, and then mixed with the light rays in the light-guiding plate, and the concentrated light rays are further to the light exit side of the light-guiding plate through net dots of the light-guiding plate, so that there are a larger amount of exiting light rays in a unit of area, thus significantly improving brightness in a local area, which brings a visually bright effect to human eyes, i.e., a phenomenon of light rays.

SUMMARY

An embodiment of this disclosure provides the following technical solutions.

A backlight source includes a back plate, a glue frame installed on the back plate, a light-guiding plate located in an accommodating space surrounded by the glue frame, and an optical film material located on the side of the light-guiding plate away from the back plate, and arranged overlapping with the light-guiding plate, wherein at least one of sides of the light-guiding plate is a light incidence side, and other sides are non-light-incidence sides; and at least one of the non-light-incidence sides, and the glue frame form together a light-eliminating structure configure to eliminate at least a part of light rays exiting from the non-light-incidence side.

Optionally, light-eliminating structure includes: a protrusion formed on the non-light-incidence side to protrude toward the glue frame, wherein a surface of the protrusion facing the back plate, a surface on the side of the light-guiding plate facing the glue frame, a part of a surface of the back plate facing the protrusion, and a part of a surface of the glue frame facing the light-guiding plate form together a light-shielding groove, wherein a first light-absorbing layer is formed on a surface on the side of the protrusion facing the back plate.

Optionally, a gap is formed between a surface of the glue frame facing the non-light-incidence side and the non-light-incidence side, a second light-absorbing layer is arranged on a side of the glue frame away from the back plate to cover the gap; a part for forming the light-shielding groove, of the surface of the glue frame facing the light-guiding plate, is an inclined surface, and an angle between the inclined surface, and a part for forming the light-shielding groove, of the surface of the back plate facing the protrusion, is an obtuse angle, so that a part of the light rays exiting from the non-light-incidence side are reflected to the second light-absorbing layer.

Optionally, the obtuse angle is 135°.

Optionally, the second light-absorbing layer is a light-shielding adhesive tape.

Optionally, a third light-absorbing layer is arranged on a part for forming the light-shielding groove, of the surface of the glue frame facing the light-guiding plate.

Optionally, a fourth light-absorbing layer is arranged on a part for forming the light-shielding groove, of the surface of the back plate facing the protrusion.

Optionally, the first light-absorbing layer is a light-shielding adhesive tape or a light-absorbing coating, the third light-absorbing layer is a light-shielding adhesive tape or a light-absorbing coating, and the fourth light-absorbing layer is a light-shielding adhesive tape or a light-absorbing coating.

Optionally, the light-absorbing coating is a thin film of poly-tetra-fluoroethylene.

This disclosure further provides a display device including the backlight source according to any one of the technical solutions above.

DETAILED DESCRIPTION OF THE EMBODIMENTS

In the related art, in order to avoid the light rays from being generated, typically the size of a light-shielding adhesive tape is increased while the backlight source is being designed, that is, an overlapping area between the light-shielding adhesive tape, and the film material and the light-guiding plate is increased to shield the area where the light rays are generated. Although there is a good effect of improving the phenomenon of light rays in this solution, the overlapping area is increased so that at least the following several problems occur.

1. A mobile phone fails to be designed with a narrow bezel as required; and 2. A valid display area of the mobile phone is reduced.

Accordingly it is of great importance to provide a backlight module, which can guarantee a real display area of a liquid crystal module, but also eliminate in effect bright lines on the edge of the liquid crystal module so as to improve the quality of an image.

The technical solutions according to the embodiments of this disclosure will be described below clearly and fully with reference to the drawings in the embodiments of this disclosure, and apparently the embodiments to be described are only a part but not all of the embodiments of this disclosure. Based upon the embodiments here this disclosure, all the other embodiments which can occur to those ordinarily skilled in the art without any inventive effort shall fall into the scope of this disclosure.

Figure 1:
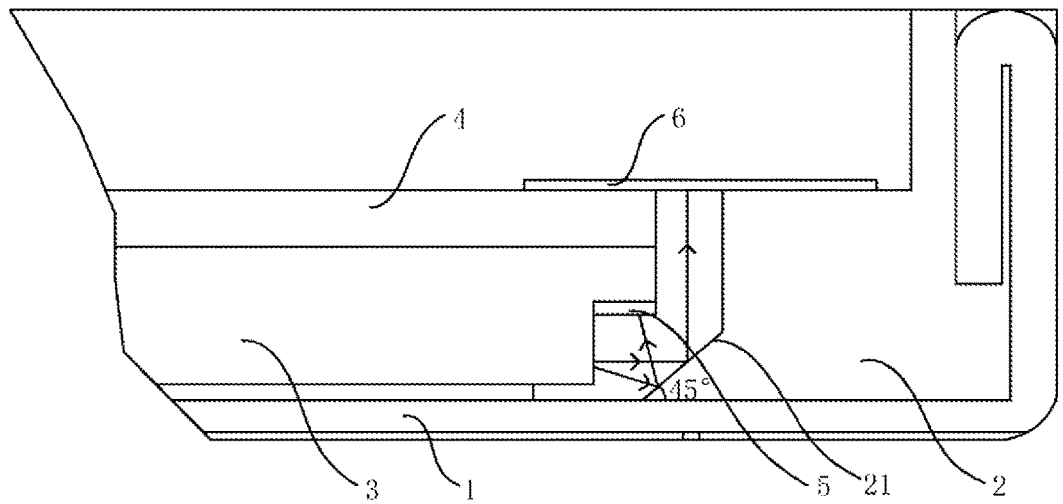
FIG. 1 is a schematic structural diagram of a backlight source according to an embodiment of this disclosure.

Referring to FIG. 1, an embodiment of this disclosure provides a backlight source includes a back plate 1, a glue frame 2 installed on the back plate 1, a light-guiding plate 3 located in an accommodating space surrounded by the glue frame 2, and an optical film material 4 located on the side of the light-guiding plate 3 away from the back plate 1, and arranged overlapping with the light-guiding plate 3, where at least one of sides of the light-guiding plate 3 is a light incidence side, and the other sides are non-light-incidence sides; and at least one of the non-light-incidence sides and the glue frame 2 form together a light-eliminating structure configure to eliminate at least a part of light rays exiting from the non-light-incidence side.

In the backlight source above, the light-guiding plate 3, and the optical film material 4, both of which are arranged overlapping with each other, are placed in the accommodating space defined by the glue frame 2; and at least one of the sides of the light-guiding plate 3 is the light incidence side, and the other sides are the non-light-incidence sides, where at least one of the non-light-incidence sides, and the glue frame 2 form together the light-eliminating structure, so after the light rays in the light-guiding plate 3 are exiting the non-light-incidence side, the light-eliminating structure formed at the light-guiding plate 3 and the glue frame 2 can eliminate at least a part of the light rays above to thereby alleviate the light rays above from being reflected at the glue frame 2 back into the light-guiding plate 3, so as to alleviate the light rays reflected back into the light-guiding plate 3 from being mixed with the light rays in the light-guiding plate 3, which would otherwise have had the light rays concentrated, thus weakening and even eliminating the light rays, and improving the image quality of the backlight source.

In the backlight source according to the embodiment of this disclosure, the light rays can be alleviated to some extent by the light-eliminating structure from being exiting the non-light-incidence side of the light-guiding plate 3, to thereby weaken and even eliminate the light rays so as to improve the image quality of the backlight source.

Accordingly the backlight source above is structurally improved to thereby lower the possibility for the light rays, exiting the non-light-incidence side of the light-guiding plate 3, to be reflected at the glue frame 2 back into the light-guiding plate 3, so as to avoid to some extent the light rays above from being mixed, which would otherwise have had the light rays concentrated, thus weakening and even eliminating the light rays while guaranteeing a valid display area, and improving the display quality of the backlight source.

Further to the technical solution above, the light-eliminating structure includes: a protrusion formed on the non-light-incidence side to protrude toward the glue frame 2, where the surface of the protrusion facing the back plate 1, the surface on the side of the light-guiding plate 3 facing the glue frame 2, a part of the surface of the back plate 1 facing the protrusion, and a part of the surface of the glue frame 2 facing the light-guiding plate 3 form together a light-shielding groove, where there is a first light-absorbing layer 5 formed on the surface on the side of the protrusion facing the back plate 1.

It shall be noted that in the structure above, the majority of light rays exiting a non-light-incidence side of the light-guiding plate 3 are reflected at the part of the surface of the glue frame 2, in the light-shielding groove, facing the light-guiding plate 3 into the first light-absorbing layer 5 on the light-shielding groove, and absorbed by the first light-absorbing layer 5 to thereby reduce the amount of light rays, going back into the light-guiding plate 3, among the reflected light rays formed of the light rays, exiting the non-light-incidence side of the light-guiding plate 3, reflected at the glue frame 2, so as to lower the possibility for the light rays going back into the light-guiding plate 3 to be mixed with the light rays in the light-guiding plate 3, which would otherwise have had the light rays concentrated, for the purpose of eliminating the bright lines.

Further to the technical solution above, there is a gap between the surface of the glue frame 2 facing the non-light-incidence side, and the non-light-incidence side, there is a second light-absorbing layer 6 arranged on the side of the glue frame 2 away from the back plate 1 to cover the gap, the part, of the surface of the glue frame 2 facing the light-guiding plate 3, for forming the light-shielding groove is an inclined surface 21, and the angle between the inclined surface 21, and the part, of the surface of the back plate 1 facing the protrusion, for forming the light-shielding groove is an obtuse angle, so that a part of the light rays exiting the non-light-incidence side are reflected to the second light-absorbing layer 6.

It shall be noted that since the part, of the surface of the glue frame 2 facing the light-guiding plate 3, for forming the light-shielding groove is the inclined surface 21, the exit angle of the reflected light rays formed of the light rays, exiting the non-light-incidence side of the light-guiding plate 3, at the glue frame 2 can be changed by the inclined surface 21 on the side of the glue frame 2 facing the light-guiding plate 3, so that a part of the reflected light rays exits the sidewall of the inclined surface 21 parallel to the glue frame 2, and thus can be transmitted to the second light-absorbing layer 6 from the gap between the glue frame 2 and the light-guiding plate 3, and absorbed by the second light-absorbing layer 6. This structure can reduce to some extent the amount of reflected light rays going back into the light-guiding plate 3 to thereby better achieve the purpose of eliminating the bright rays.

Further to the technical solution above, further referring to FIG. 1, optionally the obtuse angle between the inclined surface 21, and the part, of the surface of the back plate 1 facing the protrusion, for forming the light-shielding groove is 135°.

It shall be noted that the angle between the light rays exiting the non-light-incidence side of the light-guiding plate 3, and the non-light-incidence side of the light-guiding plate 3 generally lies in the range of 80° to 100°, so when the obtuse angle above is 135°, the light rays reflected at the glue frame 2 can be changed as much as possible to be perpendicular to the non-light-incidence side, that is, to be parallel to the inner wall of the glue frame 2, so that this part of the reflected light rays can be transmitted to the light-absorbing layer 6 from the gap between the glue frame 2 and the light-guiding plate 3, and absorbed by the second light-absorbing layer 6 to thereby better alleviate the optically poor "bright rays" so as to improve the image quality of the backlight module.

Further to the technical solution above, the light-absorbing layer 6 is a light-shielding adhesive tape.

Figure 2:
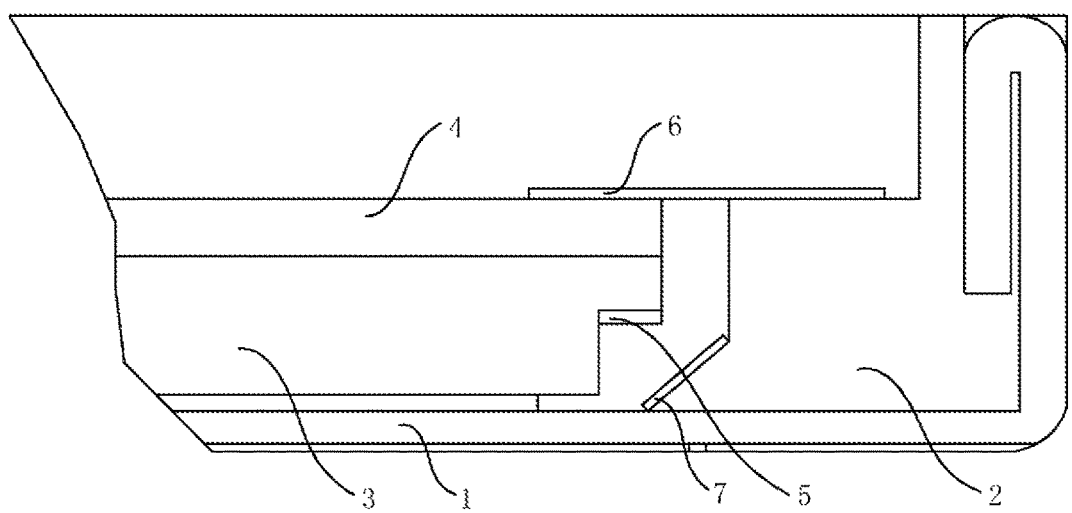
FIG. 2 is another schematic structural diagram of a backlight source according to an embodiment of this disclosure.

Further to the technical solution above, referring to FIG. 2, there is a third light-absorbing layer 7 arranged on the part, of the surface of the glue frame 2 facing the light-guiding plate 3, for forming the light-shielding groove.

It shall be noted that in this structure, the light rays exiting the non-light-incidence side of the light-guiding plate 3 is absorbed directly by the third light-absorbing layer 7 after arriving at the inclined surface 21 of the glue frame 2, but no reflected light rays are generated, thus further optimizing the effect of alleviating the optically poor phenomenon of "bright rays" in the backlight source according to the embodiment of this disclosure.

Figure 3:
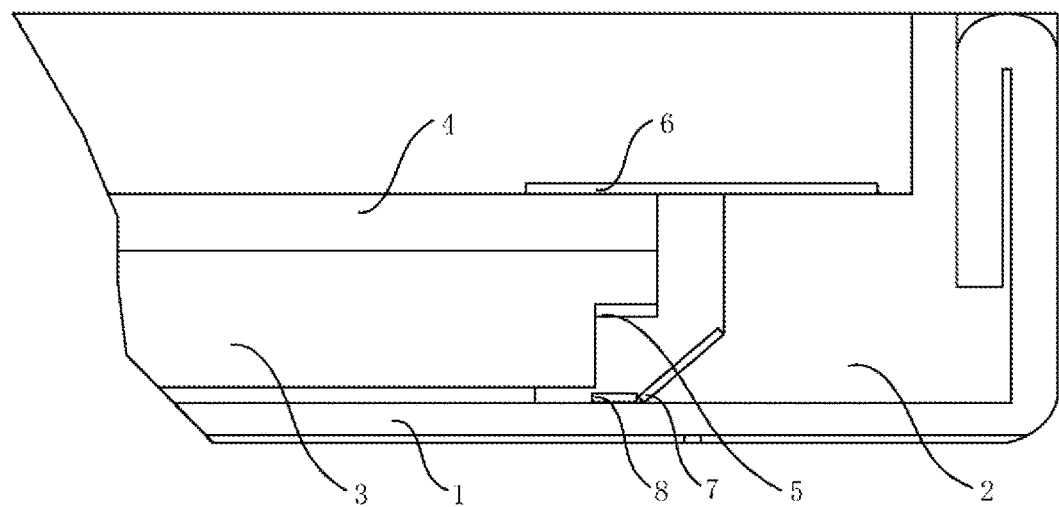
FIG. 3 is another schematic structural diagram of a backlight source according to an embodiment of this disclosure.

Further to the technical solution above, in an optional implementation, referring to FIG. 3, there is a fourth light-absorbing layer 8 arranged on the part, of the surface of the back plate 1 facing the protrusion, for forming the light-shielding groove.

It shall be noted that a part of the light rays exiting the non-light-incidence side of the light-guiding plate 3 may be incident onto the part, of the surface of the back plate 1 facing the protrusion, for forming the light-shielding groove, and further incident onto the glue frame 2 after being reflected by that part. The fourth light-absorbing layer 8 is arranged on the part, of the surface of the back plate 1 facing the protrusion, for forming the light-shielding groove, so that when a part of the light rays exiting the non-light-incidence side of the light-guiding plate 3 are incident onto that part, the part of the light rays can be absorbed by the fourth light-absorbing layer 8 arranged at that part to thereby reduce the amount of light rays, going back into the light-guiding plate 3, among the reflected light rays formed of the light rays, exiting the non-light-incidence side of the light-guiding plate 3, reflected at the glue frame 2, so as to lower the possibility for the light rays going back into the light-guiding plate 3 to be mixed with the light rays in the light-guiding plate 3, which would otherwise have had the light rays concentrated, for the purpose of eliminating the bright lines.

Further to the technical solution above, the first light-absorbing layer 5 is a light-shielding adhesive tape or a light-absorbing coating, the third light-absorbing layer 7 is a light-shielding adhesive tape or a light-absorbing coating, and the fourth light-absorbing layer 8 is a light-shielding adhesive tape or a light-absorbing coating.

Further to the technical solution above, the light-absorbing coating is a thin film of poly-tetra-fluoroethylene.

An embodiment of this disclosure further provides a display device including the backlight source according to any one of the technical solutions above.

Evidently those skilled in the art can make various modifications and variations to the disclosure without departing from the spirit and scope of this disclosure. Thus this disclosure is also intended to encompass these modifications and variations thereto so long as the modifications and variations come into the scope of the claims appended to the disclosure and their equivalents.

The invention claimed is:

1. A backlight source, comprising a back plate, a glue frame installed on the back plate, a light-guiding plate located in an accommodating space surrounded by the glue frame, and an optical film material located on a side of the light-guiding plate away from the back plate and arranged overlapping with the light-guiding plate, wherein at least one of sides of the light-guiding plate is a light incidence side, and other sides are non-light-incidence sides; and at least one of the non-light-incidence sides and the glue frame form together a light-eliminating structure configure to eliminate at least a part of light rays exiting from the non-light-incidence side;

wherein the light-eliminating structure comprises:
a protrusion formed on the non-light-incidence side to protrude toward the glue frame, wherein a surface of the protrusion facing the back plate, a surface on the side of the light-guiding plate facing the glue frame, a part of a surface of the back plate facing the protrusion, and a part of a surface of the glue frame facing the light-guiding plate form together a light-shielding groove, wherein a first light-absorbing layer is formed on a surface on the side of the protrusion facing the back plate.

2. The backlight source according to claim 1, wherein a gap is formed between a surface of the glue frame facing the non-light-incidence side and the non-light-incidence side, a second light-absorbing layer is arranged on a side of the glue frame away from the back plate to cover the gap; a part for forming the light-shielding groove, of the surface of the glue frame facing the light-guiding plate, is an inclined surface, and an angle between the inclined surface, and a part for forming the light-shielding groove, of the surface of the back plate facing the protrusion, is an obtuse angle, so that a part of the light rays exiting from the non-light-incidence side are reflected to the second light-absorbing layer.

3. The backlight source according to claim 2, wherein the obtuse angle is 135°.

4. The backlight source according to claim 2, wherein the second light-absorbing layer is a light-shielding adhesive tape.

5. The backlight source according to claim 1, wherein a third light-absorbing layer is arranged on a part for forming the light-shielding groove, of the surface of the glue frame facing the light-guiding plate.

6. The backlight source according to claim 5, wherein a fourth light-absorbing layer is arranged on a part for forming the light-shielding groove, of the surface of the back plate facing the protrusion.

7. The backlight source according to claim 6, wherein the first light-absorbing layer is a light-shielding adhesive tape or a light-absorbing coating, the third light-absorbing layer is a light-shielding adhesive tape or a light-absorbing coating, and the fourth light-absorbing layer is a light-shielding adhesive tape or a light-absorbing coating.

8. The backlight source according to claim 7, wherein the light-absorbing coating is a thin film of poly-tetra-fluoroethylene.

9. A display device, comprising the backlight source according to claim 1.

10. The display device according to claim 9, wherein a gap is formed between a surface of the glue frame facing the non-light-incidence side and the non-light-incidence side, a second light-absorbing layer is arranged on a side of the glue frame away from the back plate to cover the gap; a part for forming the light-shielding groove, of the surface of the glue frame facing the light-guiding plate, is an inclined surface, and an angle between the inclined surface, and a part for forming the light-shielding groove, of the surface of the back plate facing the protrusion, is an obtuse angle, so that a part of the light rays exiting from the non-light-incidence side are reflected to the second light-absorbing layer.

11. The display device according to claim 10, wherein the obtuse angle is 135°.

12. The display device according to claim 10, wherein the second light-absorbing layer is a light-shielding adhesive tape.

13. The display device according to claim 9, wherein a third light-absorbing layer is arranged on a part for forming the light-shielding groove, of the surface of the glue frame facing the light-guiding plate.

14. The display device according to claim 13, wherein a fourth light-absorbing layer is arranged on a part for forming the light-shielding groove, of the surface of the back plate facing the protrusion.

15. The display device according to claim 14, wherein the first light-absorbing layer is a light-shielding adhesive tape or a light-absorbing coating, the third light-absorbing layer is a light-shielding adhesive tape or a light-absorbing coating, and the fourth light-absorbing layer is a light-shielding adhesive tape or a light-absorbing coating.

16. The display device according to claim 15, wherein the light-absorbing coating is a thin film of poly-tetra-fluoro-ethylene.

* * * * *